INVENTOR
FINN T. IRGENS

United States Patent Office 3,537,720
Patented Nov. 3, 1970

3,537,720
LAWN MOWER WITH ARTICULATED FRAME ASSEMBLY
Finn T. Irgens, Milwaukee, Wis., assignor to Outboard Marine Corporation, Waukegan, Ill., a corporation of Delaware
Filed Jan. 30, 1968, Ser. No. 701,582
Int. Cl. B62b *3/02;* A01d *53/00*
U.S. Cl. 280—43                                    13 Claims

ABSTRACT OF THE DISCLOSURE

Disclosed herein is a rotary lawn mower with an articulated frame assembly comprising two side walls and a rear or end wall connected to the side walls by ball and socket joints or couplings. A blade housing carrying an engine and cutting blade is mounted within the frame assembly by studs extending through apertures in upstanding ears in the side walls and the end wall and threaded into the blade housing. A roller is located between the rear wheels and supported for swinging movement by straps pivotally connected to the side walls.

CROSS-REFERENCES TO RELATED APPLICATIONS

Reference is hereby made to my earlier filed co-pending applications Ser. Nos. 507,162 filed on Nov. 10, 1965, now U.S. Pat. No. 3,433,498 and 609,076 filed on Jan. 13, 1967.

BACKGROUND OF INVENTION

Various hazards are present in the operation of conventional rotary lawn mowers in connection with possible impact of the cutting blade with objects such as stones or pebbles which can be impelled at high velocity from beneath the blade housing, endangering the operator and bystanders. Normally, the plane or track of the cutting blade is near the lower edge of the blade housing. In conventional mowers, the clearance betwen the lower edge of the housing and the ground normally varies between one and three inches as the mower is adjusted for different depths of cut, making it possible for objects to be thrown out or ejected from under the housing. In addition, when the blade housing is tilted during travel over uneven terrain, missiles can more readily escape from beneath the housing.

U.S. application Ser. No. 609,137 filed on Jan. 13, 1967 discloses side guards which afford protection along the side of a mower to prevent ejection of missiles from beneath the mower housing. U.S. application Ser. No. 619,360 filed on Feb. 28, 1967 discloses a rotating front guard. U.S. application Ser. No. 649,259 filed on June 27, 1967 discloses a rear roller guard. This invention discloses a protective arangement for the sides and rear of a rotary mower.

SUMMARY OF INVENTION

The lawn mower of the invention provides additional protection for the mower operator and bystanders by an articulated frame assembly which permits independent vertical movement of any of the wheels and side walls in response to ground engagement to maintain a minimum clearance between the lower edges of the side walls and the ground to minimize the hazard from impelled stones. The articulated frame assembly also reduces the amount of vertical movement and tilt of the blade housing in response to changes in terrain and thus minimizes variation in the clearance between the lower edge of the blade housing and the ground. Moreover, with the frame assembly of the invention, all four wheels remain in ground engagement on uneven ground, thus distributing the load equally among the wheels facilitating movement of the mower along the ground and minimizing the depth of tracks left by the mower wheels.

The frame assembly comprises two side walls, with each side wall rotatably supporting front and rear wheels. Independent vertical movement of each side wall is afforded by universal connection of a rear wall to each of the side walls by ball and socket joints. The blade housing which carries the engine and cutting blade is supported within the frame assembly by studs or bolts extending through apertures in upstanding ears in the side walls and threaded into the blade housing. Protection at the rear of the mower is provided by a roller which is located between the rear wheels and which is pivotally supported by the side walls for swinging movement.

Further objects and advantages of the invention will become apparent from the following description and accompanying drawings.

DRAWINGS

DETAILED DESCRIPTION

Figure 2:
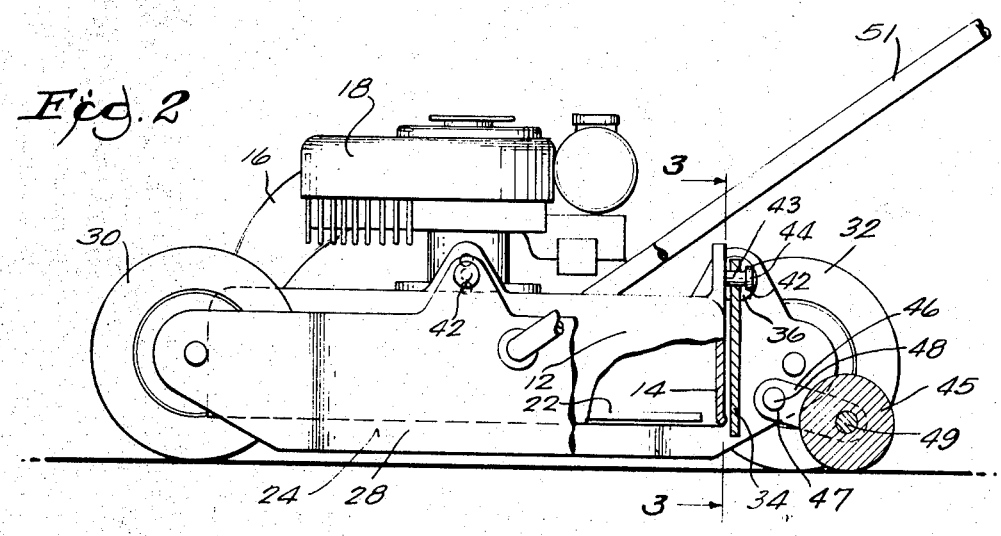
FIG. 2 is a side elevational view of the mower shown in FIG. 1.
Figure 3:
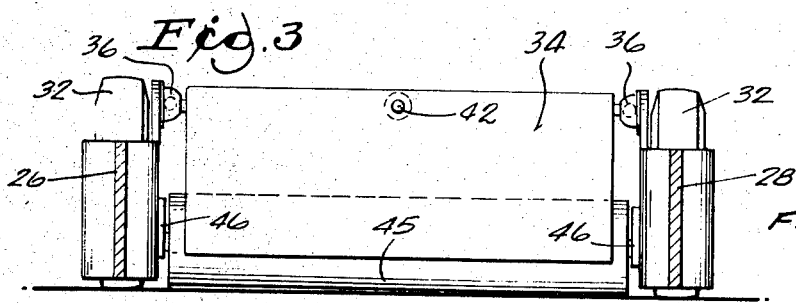
FIG. 3 is a view along line 3—3 of FIG. 2.
Figure 4:
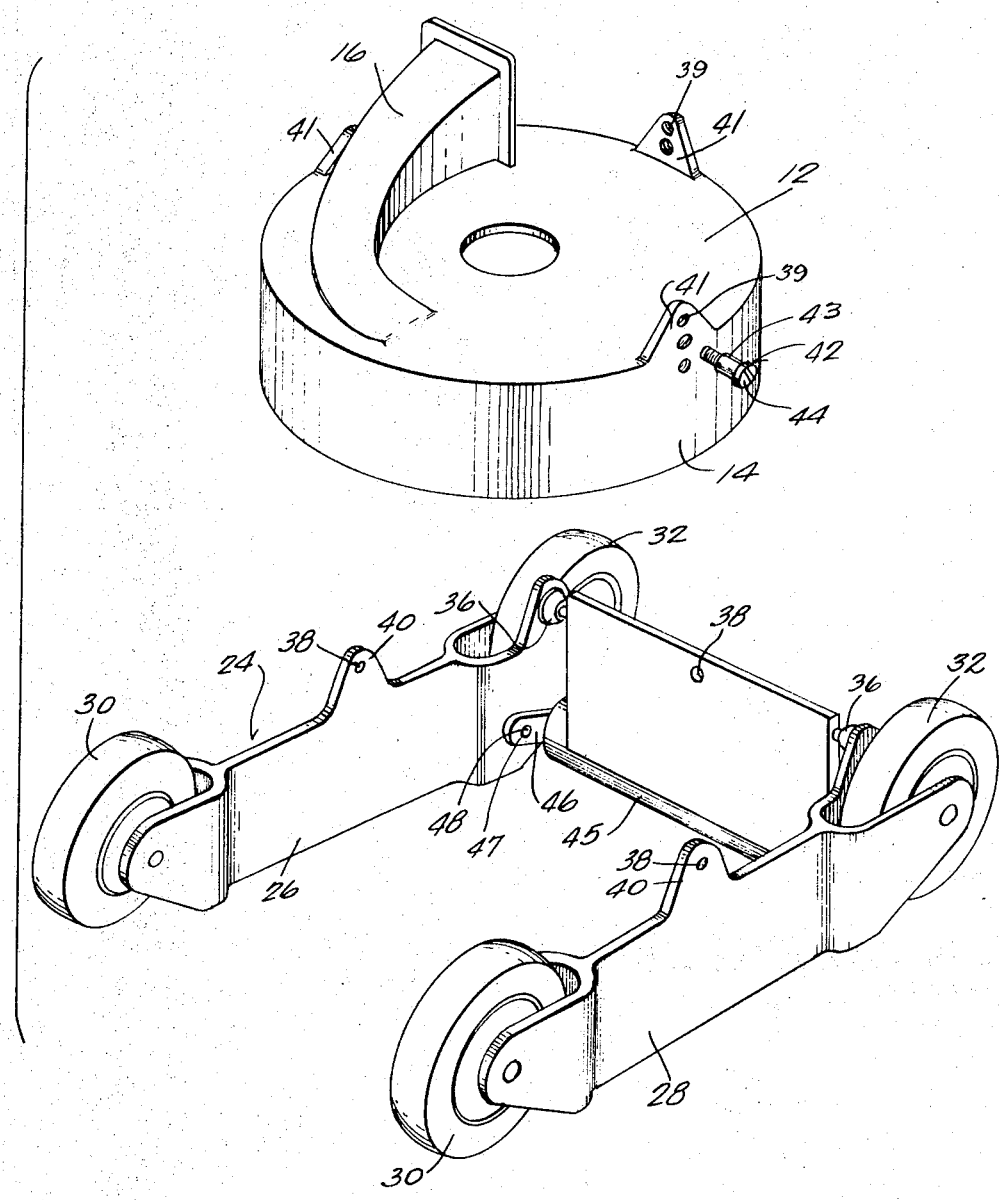
FIG. 4 is a perspective view of the blade housing and frame shown in FIG. 1.

In the drawings there is shown a rotary mower which is generally designated 10 and which includes (see FIG. 4) a blade housing 12 with a depending annular skirt 14 ad a discharge chute 16. The blade housing 12 carries (see FIG. 2) an engine 18 having an output shaft 20 which rotates a cutting blade 22 within the blade housing 12.

In accordance with the invention the rotary mower 10 includes an articulated frame assembly 24 which includes right and left side walls 26 and 28. Both side walls are supported above the ground by respective front and rear wheels 30 and 32. Means are provided for connecting the side walls 26 and 28 to afford independent vertical movement of the side walls in response to engagement with the ground.

In disclosed construction the means provided for connecting the side walls comprises a rear wall 34 which is universally connected at each end to the side walls 26 and 28 by ball and socket connections or joints 36. In the alternative, the rear wall 34 can be connected to the side walls 26 and 28 by brackets in the form of yokes secured to the side walls with horizontally extending cross pins extending through apertures or slots in the yoke and through cross bores in the ends of the rear wall 34. The connections between the rear wall 34 and the side walls 26, 28 also desirably are provided with some slack to afford movement of the side walls 26, 28 away from the rear wall 34 as the side walls are displaced in response to changes in terrain. The rear wall is narrower in height than the side walls and extends only a small distance beneath the lower edge of the blade housing to prevent drag on the grass or ground during mower movement. Protection in the clearance area at the rear of the blade housing is afforded by a roller hereinafter described.

Means are provided for supporting the blade housing 12 within the frame 24. In the disclosed construction means comprises apertures 38 located in each of the upstanding ears 40 in the side walls and rear wall and bolts 42 extending through the apertures 38 and threaded into the apertures 39 in upstanding ears 41 in the blade housing 12. The apertures 38 are desirably in the same plane as the ball and socket joints 36. There is sufficient clearance between the shoulders 43 on the bolts 42 and the aperture walls to permit movement of the side walls 26, 28 in response to changes in elevation of the ground. In addition, the heads 44 of the bolts 42 are spaced slightly from the side walls 26, 28 to afford outward horizontal displacement of the side walls during movement of the ball and socket connections. The vertically aligned apertures 39 afford height adjustment of the cutting blade 22 to vary the depth of cut.

Additional protection at the rear of the mower can be afforded by a roller 45 which is located between the rear wheels. Means are provided for mounting the roller to the side walls 26 and 28 for rotatable and vertical swinging movement in the form of two straps 46 which are pivotally connected at 47 to the side walls by pins 48.

The roller is connected to the straps by two co-axial shafts 49 which extend from the roller 45 and into apertures 50 in the straps 46. The connection between the straps 46 and the shafts 49 desirable affords some axial movement of the straps 46 over the shafts 49 upon displacement of the side walls.

Figure 1:
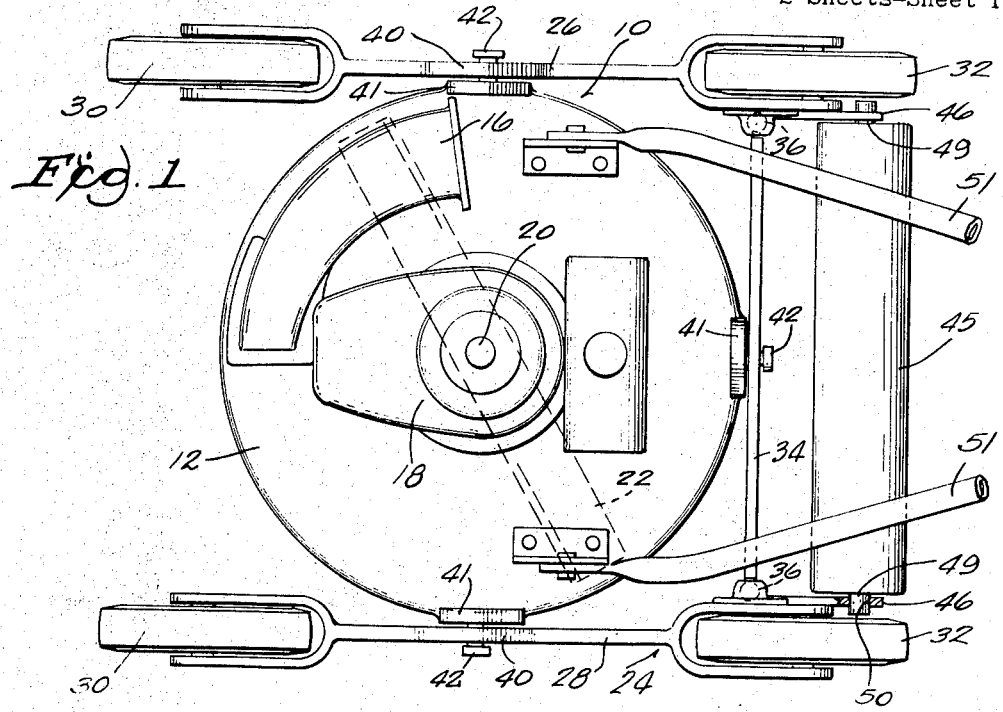
FIG. 1 is a plan view of the rotary mower in accordance with the invention.

To guide mower movement, the mower 10 is provided with a handle 51 which can be connected to the blade housing 12 as shown in FIG. 1, or in the alternative, the handle 51 can be connected to the side walls 26 and 28.

In operation of the rotary mower 10 the ball and socket connections 36 between the side walls 24, 26 and the rear wall 34 will afford an articulating movement of the frame assembly and vertical movement of the wheels in conformity to the contour of the terrain, thus the side walls 26 and 28 will be maintained in substantially constant clearance above the surface of the ground to minimize escape of impelled missiles. Vertical movement and tilt of the blade housing is minimized to give an even cut though one or more wheels may engage rises or depressions. The rear roller 42 will prevent missile ejection at the rear of the rotary mower and will remain in ground engagement irrespective of vertical movement of the side walls.

All four wheels will remain in engagement with the ground during travel over uneven ground, thus distributing the weight of the mower between all four wheels, which facilitates mower movement and minimizes the depth of the tracks in a soft lawn.

Various of the features of the invention are set forth in the following claims.

What is claimed is:

1. A rotary lawn mower comprising a frame including a pair of spaced apart rigid side walls, wheels rotatably mounted on each of said side walls in such manner as to locate the lower edge of said side walls in close relation to the ground, means spacing said side walls to connect said side walls to each other and provide independent vertical movement of each of said side walls in response to engagement of said wheels with the ground, a blade housing, means connecting said blade housing to said side walls and to said means spacing said side walls for relative movement therebetween to afford said independent vertical movement of said side walls, a roller located between said wheels, and means for mounting said roller to said frame for rotatable and vertical swinging movement in response to engagement with the ground.

2. A rotary lawn mower including a pair of spaced apart side walls, wheels rotatably mounted on each of said side walls in such manner as to locate the lower edge of said side walls in close relation to the ground, means connecting said side walls to provide independent vertical movement of each of said side walls in response to engagement of said wheels with the ground, a blade housing, and means connecting said blade housing to said side walls for relative movement therebetween to afford said independent vertical movement of said side walls.

3. A rotary lawn mower comprising a frame assembly including a pair of spaced apart rigid side walls, wheels rotatably mounted on each of said side walls in such manner as to locate the lower edge of said side walls in close relation to the ground, and a rear wall having ends pivotally connected to said side walls to afford independent vertical movement of each of said side walls in response to changes in elevation of the ground, a blade housing, and means connecting said blade housing to said frame assembly for relative movement therebetween to afford said independent vertical movement of said side walls.

4. A rotary lawn mower in accordance with claim 13 wherein said means connecting said blade housing to said frame assembly includes means for vertical swinging movement relative to said frame assembly.

5. A rotary lawn mower including a pair of rigid side walls, wheels rotatably mounted on each of said side walls in such manner as to locate the lower edge of said side walls in close relation to the ground, and means spacing said side walls to connect said side walls to each other and provide independent vertical movement of each of said side walls in response to engagement of said wheels with the ground, a blade housing, and means connecting said blade housing to said side walls and to said means spacing said side walls for relative movement therebetween to afford said independent movement of said side walls.

6. A lawn mower in accordance with claim 5 including a handle connected to said side walls.

7. A lawn mower in accordance with claim 5 wherein said means spacing said side walls comprises a rear wall and means pivotally connecting said rear wall to each of said side walls for movement about a generally horizontal axis.

8. A lawn mower in accordance with claim 7 wherein said means pivotally connecting said rear wall to each of said side walls comprises ball and socket joints.

9. A lawn mower in accordance with claim 7 wherein said side walls and rear wall have upstanding ears and said blade housing has upstanding ears adjacent the ears on said side walls and said rear wall, said ears on said blade housing being provided with a plurality of vertically aligned apertures, said ears on said side walls and rear wall having apertures, and bolts extending through said apertures in said side walls and rear wall and threadably engaging said apertures in said blade housing.

10. A lawn mower in accordance with claim 7 wherein said means pivotally connecting said rear wall to each of said side walls comprises ball and socket joints, and said means connecting said blade housing to said side walls and to said means connecting said side walls comprises apertures in said side walls and said rear wall and bolts extending through said apertures and threaded into said blade housing.

11. A lawn mower in accordance with claim 10 wherein said ball and socket joints and said apertures are within the same plane.

12. A lawn mower in accordance with claim 10 wherein said apertures are located in upstanding ears in said side walls and said rear wall.

13. A lawn mower in accordance with claim 10 wherein one of said blade housing and said side and rear walls has a plurality of vertically aligned aperatures to afford height adjustment between said blade housing and said side and rear walls.

References Cited
UNITED STATES PATENTS

| | | | |
|---|---|---|---|
| 1,868,347 | 7/1932 | Cloud | 56—25.4 |
| 3,001,798 | 9/1961 | Logan | 280—104 |
| 3,043,604 | 7/1962 | Rehnberg et al. | 280—43 |
| 3,299,622 | 1/1967 | Hanson et al. | 56—25.4 |
| 3,313,555 | 4/1967 | Relmer | 280—104 |
| 3,402,535 | 9/1968 | Nelson | 56—25.4 |

BENJAMIN HERSH, Primary Examiner

LESLIE J. PAPERNER, Assistant Examiner

U.S. Cl. X.R.

56—25.4; 280—47.34, 104

PO-1050
(5/69)

UNITED STATES PATENT OFFICE
CERTIFICATE OF CORRECTION

Patent No. 3,537,720        Dated November 3, 1970

Inventor(s) Finn T. Irgens

It is certified that error appears in the above-identified patent and that said Letters Patent are hereby corrected as shown below:

| | |
|---|---|
| Column 2, line 43 | "ad" should read --- and --- |
| Column 2, line 55 | before "disclosed", insert --- the --- |
| Column 3, line 11 | before "means", insert --- the --- |
| Claim 4, line 1 | "Claim 13" should read --- Claim 3 ---. |

Signed and sealed this 29th day of June 1971.

(SEAL)
Attest:

EDWARD M. FLETCHER, JR.
Attesting Officer

WILLIAM E. SCHUYLER, JR.
Commissioner of Patents